Figure 1:
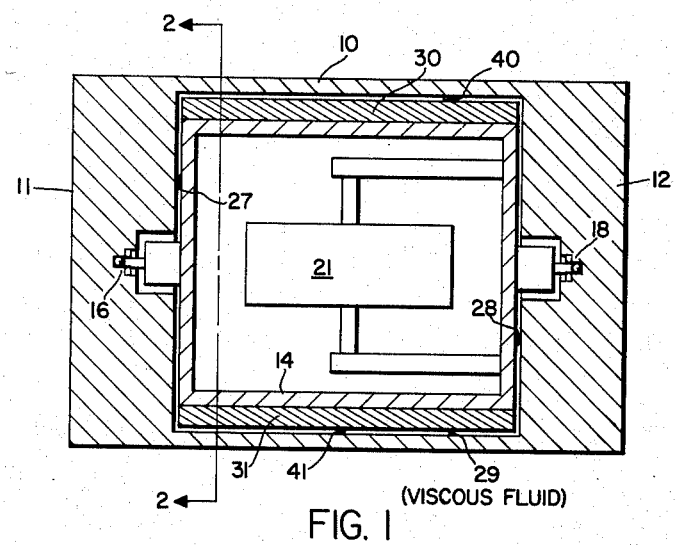

Aug. 25, 1959     K. H. WHITE     2,900,823
INERTIAL APPARATUS
Filed March 4, 1957

INVENTOR.
KENNETH H. WHITE
BY Roger W. Jensen
ATTORNEY

United States Patent Office 2,900,823
Patented Aug. 25, 1959

2,900,823

INERTIAL APPARATUS

Kenneth H. White, White Bear Lake, Minn., assignor to Minneapolis-Honeywell Regulator Company, Minneapolis, Minn., a corporation of Delaware Application March 4, 1957, Serial No. 643,704

8 Claims. (Cl. 74—5.5)

This invention pertains generally to the field of inertial elements such as gyroscopes and more specifically to the field of floated inertial elements. Floated gyroscopes as shown in the patents to C. S. Draper, 2,752,790 and J. J. Jarosh et al. 2,752,191 are well known in the art. Floated gyroscopes comprise in part a gimbal or chamber enclosing a gyroscope, a housing around the gimbal, support means supporting the gimbal in the housing for rotation relative to the housing about an axis usually identified as the output axis, and a fluid for floating the gimbal assembly in substantially neutral suspension. Due to the fact that the fluid supports substantially all of the weight of the gimbal very little loading is placed on the bearing means that defines said output axis. Accordingly, the bearing means may be very delicate and virtually frictionless. As a result of the low friction in the bearing means the errors of the floated gyro are very low. The fluid also cushions the device against shock and accordingly a very rugged device is produced. The fluid further acts as a viscous restraint against rotation of the gimbal assembly about its output axis, and thus serves as a damping means and as an integration means.

A floated gyroscope provides an integrating function due to the fact that rotation of the gimbal assembly about its output axis is restrained or opposed by a retarding torque or viscous drag developed by the action of the viscous fluid on the gimbal assembly. It is necessary that the damping torque produced by the viscous fluid be a linear function of the gimbal angular turning rate in order to have accuracy of integration.

The amount of damping that is produced in a floated gyro depends on several factors. First, the damping is an inverse function of the damping gap between the gimbal assembly and the housing. Secondly, the damping is proportional to the area of the gimbal assembly and thus is proportional to both the length and the diameter of the gimbal assembly. Third, the damping is a function of the viscosity of the damping fluid.

In many applications of floated gyros it is desirable to increase the amount of damping action over the damping available in the presently constructed floated gyros. It has been found very difficult to effectively increase the amount of damping in a gyro without being penalized in one way or another. For example, if the damping gap between the gimbal assembly and the housing is reduced so as to increase the damping then it becomes almost impossible to properly fill the gyro with damping fluid. Related to this problem is the fact that if the entire chamber within the housing is not filled with fluid then the fluid will have tiny bubbles of air or gas disposed at random throughout the fluid, which bubbles will tend to migrate around through the fluid in the gyro. Some of these bubbles will find their way into the gap between the gimbal assembly and the housing and will introduce errors into the operation of the gyro. They can cause torques to the gyro about the output axis and further can destroy the linearity of the damping. Accordingly, it is very important not to have any bubbles in the viscous fluid supporting the gimbal assembly. The smaller the gap between the gimbal assembly and the housing, the more difficult it is to properly fill the housing without introducing bubbles in the fluid.

If the area of the gimbal is increased in an attempt to obtain more damping, then the overall size of the gyro must be increased since the area can only be increased by extending the length of the gimbal assembly or by increasing the diameter of the gimbal assembly. Increasing the size of the overall gyro is obviously unsatisfactory especially in applications where weight and size are of utmost importance. In addition to that, gimbal inertia is increased with increasing the size of the gimbal which introduces other errors in the operation of the gyro. Further, the greater the size of the gimbal, the less rigid the structure becomes. It is clear therefore that it is unsatisfactory to increase the size of the gyro merely to obtain additional damping.

If the viscosity of the damping fluid is increased in an attempt to obtain more damping two problems are encountered. The first is that the higher the viscosity of the fluid, the more difficult it is to properly fill the gyro. This again introduces the problem of having bubbles in the gyro fluid which are sources of error to the gyro. The second problem with the higher viscosity fluids is that they also have relatively high freezing points or temperatures at which they solidify. Conversely the lower viscosity fluids (which produce less damping) have relatively low freezing points. The freezing point of the viscous fluids is important in floated gyros for two reasons. First it has been found that when the viscous fluid freezes that some of the delicate components within the gyro such as the flexible conductive leads which are used to energize the gyro spin motors are sometimes damaged. This is caused due to the fact that the viscous fluid will have a different coefficient of temperature expansion from the coefficients of expansion of the various other members of the gyro. Secondly when the gyro fluid freezes it tends to contract and thus tends to produce voids within the gyro housing which in turn results in bubbles being introduced into the fluid so that when the gyro is subsequently used there are errors in the output of the gyro as has been discussed above.

It is apparent therefore that it is generally unsatisfactory to increase the damping in a gyro by decreasing the gap, by increasing the gimbal area, or by increasing the viscosity of the viscous fluid.

The present invention concerns a new configuration of the gyro gimbal structure and the gyro housing which differs considerably from prior art floated gyroscopes and provides a considerable increase in damping for a given gimbal diameter and area over what was available previously in a floated gyroscope for any given viscous fluid. A floated gyro constructed according to the present invention is inherently much easier to fill with viscous fluid than the prior art gyros. In fact, the present invention permits the use of much higher viscosity viscous fluids than could be used previously without incurring the problem of bubbles in the fluid during the filling process. On the other hand, if it is desired to use a relatively low viscosity fluid so as to minimize the problems associated with freezing of the fluid then the present invention will provide an adequate amount of damping for a given gyro size as compared to inadequate damping produced by the prior art gyros for the same general gyro size and with the same low viscosity fluid. The present invention also provides very linear damping. That is, the damping imposed upon relative rotation between the gimbal assembly and the housing by the present invention is a linear function of angular displacement of the gimbal about its output axis.

The present invention comprises having a plurality of longitudinal ribs or vanes or projections on the gimbal assembly and a plurality of ribs or vanes or projections on the inside of the gyro housing. A much larger main gap is provided between the gimbal assembly and the housing as compared to the relative size of the damping gap in the prior art gyros. The above mentioned ribs on the gimbal assembly extend outwardly from the gimbal assembly a substantial portion of this larger gap towards the housing and terminate short of the housing defining narrow restrictive gaps. Also the vanes or ribs on the housing extend inwardly from the housing a substantial portion of the larger gap toward the gimbal assembly and terminate short of the gimbal assembly defining therebetween additional restrictive gaps. It will be appreciated that the main large gap will greatly facilitate the filling of fluid in the gyro. When there is relative rotation between the gimbal assembly and the gyro housing of the present invention the vanes on the gimbal assembly and the vanes on the housing produce a pumping action on the viscous fluid in the main gap and force it through the restrictive gaps. The pumping action in effect is a differential of pressure on opposite sides of the vanes so a net force is developed on each vane proportional to the product of the pressure differential times the side area of each vane. This force multiplied times the distance of the force from the output axis of the gyro is the damping restraint or torque imposed upon rotation of the gimbal assembly by that vane. The greater the angular rate of the gimbal assembly relative to the gyro housing, the greater will be the pressure differential on opposite sides of each vane. Accordingly, the damping torque on each vane will increase as a function of the angular rate of the gimbal assembly relative to the housing.

An object of the invention therefore is to provide an improved inertial apparatus.

It is a further object of this invention to provide an improved damping apparatus for floated instruments such as floated gyros.

Figure 2:
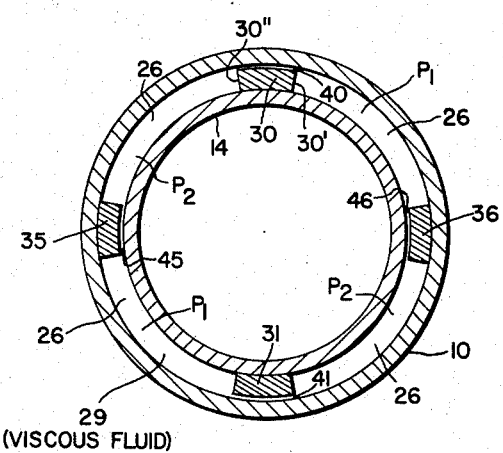

Other objects of the invention will become apparent from a reading of the following specification and appended claims, in conjunction with the accompanying drawing in which:

Figure 1 is a longitudinal cross-sectional view (in a somewhat schematic form) of a floated gyroscope embodying my invention; and Figure 2 is a transverse cross-sectional view of the device shown in Figure 1.

Referring to Figure 1 a housing or case 10 is of a generally hollow cylindrical shape and has end portions 11 and 12 closing off the ends thereof. Positioned within housing 10 is a gimbal or chamber 14 which is also of a generally hollow cylindrical shape as may better be seen in Figure 2. Delicate bearing means 16 and 18 positioned respectively in end portions 11 and 12 of the housing 10 support gimbal or chamber member 14 for rotation relative to housing 10 about an output axis. Thus bearing means 16 and 18 define the gyroscope output axis.

A gyroscope 21 is mounted by suitable means within the gimbal or chamber member 14 for rotation about a spin axis which is at right angles to the output axis defined by bearing means 16 and 18. Means not shown are provided for causing the rotor member of the gyroscope 21 to rotate.

The inner diameter of housing 10 is somewhat larger than the outer diameter of chamber 14 and an annular gap 26 is defined therebetween. End portions 11 and 12 of housing 10 are adjacent to the axial ends of chamber 14. A pair of relatively narrow axial gaps 27 and 28 are defined between the axial ends of chamber 14 and end portions 11 and 12 of housing 10.

A viscous fluid 29 is disposed in and fills housing 10, surrounding the chamber of gimbal 14 and filling gaps 26, 27 and 28. Gimbal 14 is designed so that it has a density subsantially equal to the density of the viscous fluid 29 and hence the gimbal 14 is buoyed up in substantial neutral suspension by the fluid.

To provide damping of relative rotation between gimbal or chamber 14 and housing 10 a plurality of ribs or vanes 30, 31 are fastened with suitable means or are integral with the gimbal or chamber 14 and generally extend from one end of gimbal 14 to the other in a direction which preferably is parallel to the output axis defined by bearings 16 and 18. Cooperating with the vanes 30 and 31 on the gimbal 14 are a plurality of fixed or stationary vanes 35 and 36 mounted inside of housing or case 10 and extending generally along the side of housing 10 and preferably parallel to the axis defined by bearings 16 and 18. Vanes or ribs 30 and 31 extend outwardly from gimbal 14 toward housing 10 and conversely ribs or vanes 35 and 36 extend inwardly from housing 10 toward the gimbal 14. Vanes 35 and 36 may be fastened to housing 10 by suitable means or may be integral with the housing. Vanes 30 and 31 are on opposite sides of the output axis from one another. Vanes 35 and 36 are also on opposite sides of the output axis. When the gimbal assembly 14 is in its normal or null position with respect to housing 10 the vanes 30 and 31 are equally displaced about the output axis from vanes 35 and 36.

The ribs 30 and 31 extend outwardly from gimbal 14 toward housing 10 a substantial portion of the gap 26 forming narrower gaps 40 and 41 respectively between the vanes 30 and 31 and the inside of housing 10. Also the ribs or vanes 35 and 36 extend inwardly from housing 10 toward gimbal 14 a substantial portion of the gap 26 forming gaps 45 and 46 respectively between vanes 35 and 36 and the exterior of gimbal or chamber 14. The radial thickness of the gaps 40, 41, 45 and 46 as well as the areas of the arcuate faces of the vanes determine the resistance to flow of the viscous fluid 29 through the gaps. Assuming a constant gap radial thickness and vane axial length, then the arcuate face width of the vanes will have a direct effect on the damping. As shown, if gimbal 14 were allowed to rotate relative to housing 10 a substantial angular amount, the vanes or ribs 30 and 31 on gimbal 14 would come into contact with or engage the ribs or vanes 35 and 36 attached to the housing 10. In actual practice other means, not shown, would serve as a stop means to allow gimbal 14 to rotate relative to the housing 10 merely a few degrees either side of the normal position of the gimbal 14 which corresponds to that shown in the drawing.

*Operation*

One use of a floated gyroscope is to integrate angular rate of the gyro about its input axis (the input axis being defined as the axis perpendicular to both the gyro spin axis and the gyro output axis). The amount of angular displacement of the gimbal assembly about the output axis is a measure of the time integral of the angular rate of the gyroscope about the input axis and hence is a measure of the total angular displacement about the input axis.

The integration is performed because the rotation of the gimbal about its output axis is opposed by a retarding torque developed by the action of the viscous fluid on the gimbal assembly. In order to have accuracy of integration it is necessary that the damping torque be a linear function of gimbal angular turning rate.

The damping means of the present invention as described above will serve to provide a damping torque that is a linear function of the angular turning rate between the gimbal 14 and the housing 10. The paddles 30, 31, 35 and 36 produce a pumping action upon the viscous fluid 25. Assume, for example, that the gimbal 14 as shown in Figure 2 would tend to rotate clockwise about the output axis relative to the housing 10. This would mean that vane or rib 30 would move toward rib or vane 36 and away from rib or vane 35. Also rib 31 on gimbal 14 would rotate toward rib 35 and away from rib 36. Thus the viscous fluid 25 in gap 26 between ribs 30 and 36 would be under pressure as would the fluid in the gap 26 between ribs 31 and 35. This pressure is represented in Figure 2 as $P_1$. Conversely, there would be a tendency to develop a reduction in pressure in the portion of the gap 26 between ribs 35 and 30 and between ribs 31 and 36. This lesser pressure is represented in Figure 2 as $P_2$. The fluid under pressure $P_1$ between ribs 30 and 36 is forced to flow through the restricted gaps 45, 46, 40 and 41 defined between the inwardly extending faces of stationary ribs 35 and 36 in the exterior of gimbal 14 and the outwardly extending faces of ribs 30 and 31 and the inner surface of housing 10 so as to flow into the zones of lesser pressure $P_2$ defined between ribs 31 and 36 and between ribs 30 and 35.

The pumping action of the vanes forces the viscous fluid 29 through the restrictive gaps 40, 41, 45 and 46 at a velocity considerably higher than the angular velocity of the gimbal 14 relative to housing 10. The velocity of the fluid 29 flowing through the restrictive gaps 40, 41, 45 and 46 is a function of the difference between pressure $P_1$ and pressure $P_2$.

Each of the vanes 30 and 31 on the chamber 14 retards or damps rotation of the chamber 14 due to the differential of pressures on opposite sides thereof. For the example of clockwise rotation of chamber 14 relative to housing 10, pressure $P_1$ is greater than pressure $P_2$. Pressure $P_1$ is applied to side 30' of vane 30 and pressure $P_2$ is applied to side 30'' of vane 30. The areas of sides 30' and 30'' are equal so a net torque equal to the difference between pressures $P_1$ and $P_2$ multiplied times the area of side 30' multiplied by the distance from the output axis is applied to the chamber 14. A similar retarding torque is developed as a result of the differential of pressures $P_1$ and $P_2$ applied to vane 31.

It will be appreciated that the pressure differential acting on the vanes 30 and 31 for a given angular turning rate of the gimbal is a function of fluid viscosity, radial thickness of the restrictive gaps and the area of the arcuate faces of the vanes. Assuming a constant axial length of the vanes, then the damping would vary in accordance with the arcuate width of the vanes. Generally, as shown in Figure 2, the vanes will have a substantial arcuate width.

Axial gaps 27 and 28 are designed to prevent excessive end leakage of the viscous fluid 29 when it is under pressure due to gimbal rotation.

Therefore, with the present invention, viscous fluids of relatively low viscosity may be used with their inherent advantages of relatively low freezing points and still an adequate amount of damping will be obtained due to the higher damping action provided by the apparatus described.

The fluid pumped into the zones of lesser pressure comes into each zone from both sides and the two velocity vectors representing the velocity of the fluid being pumped are equal and tend to cancel one another out, and thus removes a possible source of error. For example, take the zone of lesser pressure defined between ribs 31 and 36 for the case of clockwise rotation of gimbal 14. Fluid enters this zone by flowing from the zone defined between vanes 30 and 36 through the restrictive gap 46 adjacent to rib 36 and also from the zone defined between ribs 31 and 35 through the gap 41 defined between rib 31 and housing 10. Due to the symmetry of the apparatus the velocities of the two streams of fluid being pumped will be approximately equal to one another and the velocity effects will cancel out.

While I have shown and described a specific embodiment of this invention, further modifications and improvements will appear to those skilled in the art. I desire it to be understood, therefore, that this invention is not limited to the particular form shown and I intend in the appended claims to cover all modifications which do not depart from the spirit and scope of this invention.

What I claim is:

1. In a floated gyroscope: a generally hollow cylindrical housing; a generally hollow cylindrical chamber in said housing; a gyroscope in said chamber; support means for rotatably supporting said chamber in said housing for rotation about an axis, said chamber having a normal position relative to said housing; a fluid in said housing and surrounding said chamber; and means for resisting relative rotation of said chamber and said housing about said axis comprising a plurality of vanes on said chamber extending generally parallel to said axis and outwardly from said chamber, toward said housing defining a plurality of restrictive gaps between said vanes on said chamber and said housing, and a plurality of vanes on said housing extending generally parallel to said axis and inwardly from said housing toward said chamber defining a plurality of restrictive gaps between said vanes on said housing and said generally cylindrical chamber, said vanes on said housing and said chamber terminating with arcuate faces of substantial width.

2. In a floated inertial instrument: a generally hollow cylindrical housing; a generally hollow cylindrical chamber in said housing; an inertial element in said chamber; support means for rotatably supporting said chamber in said housing for rotation about an axis, said chamber having a normal position relative to said housing; a fluid in said housing and surrounding said chamber; and means for resisting relative rotation of said chamber and said housing about said axis comprising a plurality of vanes on said chamber extending generally parallel to said axis and outwardly from said chamber toward said housing defining a plurality of restrictive gaps between said vanes on said chamber and said generally hollow cylindrical housing, and a plurality of vanes on said housing extending generally parallel to said axis and inwardly from said housing toward said chamber defining a plurality of restrictive gaps between said vanes on said housing and said generally cylindrical chamber.

3. In a floated gyroscope: a housing; a chamber; a gyroscope mounted in said chamber; support means for rotatably supporting said chamber in said housing for rotation relative to said housing about an axis, said chamber having a normal position relative to said housing; a fluid in said housing and surrounding said chamber; and means of resisting relative rotation of said chamber and said housing about said axis comprising a plurality of vanes on said housing extending generally parallel to said axis and outwardly from said chamber and a plurality of vanes on said housing extending generally parallel to said axis and inwardly from said housing, as to define a plurality of restrictive gaps.

4. In a floated gyroscope: a housing; a chamber; a gyroscope mounted in said chamber; support means for rotatably supporting said chamber in said housing for rotation relative to said housing about an axis, said chamber having a normal position relative to said housing; a fluid in said housing and surrounding said chamber; and means for resisting relative rotation of said chamber and said housing about said axis comprising a plurality of vanes on said chamber extending generally parallel to said axis and outwardly from said chamber toward said housing defining a plurality of restrictive gaps between said vanes on said chamber and said housing, and a plurality of vanes on said housing extending generally parallel to said axis and inwardly from said housing toward said chamber defining a plurality of restrictive gaps between said vanes on said housing and said chamber.

5. In a floated gyroscope: a housing; a chamber; a gyroscope mounted in said chamber; support means for rotatably supporting said chamber in said housing for rotation relative to said housing about an axis, said chamber having a normal position relative to said housing; a fluid in said housing and surrounding said chamber; and means for resisting relative rotation of said chamber and said housing about said axis comprising a vane on said chamber extending outwardly from said chamber toward said housing and a vane on said housing extending inwardly from said housing toward said chamber, said vanes, chamber and housing being proportioned so as to define restrictive gaps, and said vanes having a substantial width.

6. A floated inertial instrument comprising a housing; a chamber; support means for rotatably supporting said chamber in said housing for rotation about an axis; an inertial element mounted in said chamber; a fluid filling said housing and surrounding said chamber; and means for resisting rotation of said chamber about said axis comprising a projection on said chamber extending outwardly toward said housing, defining a restrictive gap between said projection on said chamber and said housing, and a projection on said housing extending inwardly toward said chamber, defining a restrictive gap between said projection on said housing and said chamber, said projections being positioned relative to one another so as to cause movement of said fluid upon relative rotation between said housing and said chamber.

7. In an inertial instrument: a housing; a gimbal; means for rotatably supporting said gimbal on said housing for relative rotation therebetween about an axis; a gyroscope mounted on said gimbal; and means for resisting relative rotation of said gimbal and said housing about said axis comprising a plurality of vanes on said gimbal extending substantially parallel to said axis and radially from said gimbal toward said housing, a plurality of vanes on said housing extending substantially parallel to said axis and radially from said housing toward said gimbal, fluid means in contact with said vanes, and restrictive gap means, said vanes on said housing and said gimbal coacting together and with said fluid means to pump said fluid means through said restrictive gap means upon a relative rotation between said housing and said gimbal about said axis.

8. In an inertial instrument: a housing; a gimbal; means for rotatably supporting said gimbal on said housing for relative rotation therebetween about an axis; inertial means mounted on said gimbal; and means for resisting relative rotation of said gimbal and said housing about said axis comprising a plurality of vanes on said gimbal extending substantially radially from said gimbal toward said housing, a plurality of vanes on said housing extending substantially radially from said housing toward said gimbal, fluid means in contact with said vanes, and restrictive gap means, said vanes on said housing and said gimbal coacting together and with said fluid means to pump said fluid means through said restrictive gap means upon a relative rotation between said housing and said gimbal about said axis.

References Cited in the file of this patent
UNITED STATES PATENTS

| | | |
|---|---|---|
| 740,473 | Scherer | Oct. 6, 1903 |
| 1,630,737 | Flanders | May 31, 1927 |
| 1,964,869 | Boykow | July 3, 1934 |
| 2,752,790 | Draper | July 3, 1956 |
| 2,790,520 | Kuhn | Apr. 30, 1957 |

Notice of Adverse Decision in Interference

In Interference No. 91,143 involving Patent No. 2,900,823, K. H. White, INERTIAL APPARATUS, final judgment adverse to the patentee was rendered Oct. 12, 1962, as to claims 1, 2, 3, 4, 5, 6, 7 and 8.
[*Official Gazette May 4, 1965.*]